US012664324B2

(12) United States Patent
Zhang et al.

(10) Patent No.: US 12,664,324 B2
(45) Date of Patent: Jun. 23, 2026

(54) EXTERNAL PROTECTIVE DEVICE AND METHOD FOR PROTECTION AGAINST ATTACKS USING A HID KEYBOARD OR MOUSE

(71) Applicant: BEIJING BEYONDINFO TECHNOLOGY CO., LTD., Beijing (CN)

(72) Inventors: Hao Zhang, Beijing (CN); Hua Du, Beijing (CN); Zhenhe Cai, Beijing (CN)

( * ) Notice: Subject to any disclaimer, the term of this patent is extended or adjusted under 35 U.S.C. 154(b) by 10 days.

(21) Appl. No.: 18/882,401

(22) Filed: Sep. 11, 2024

(65) Prior Publication Data

US 2025/0005210 A1     Jan. 2, 2025

Related U.S. Application Data

(63) Continuation of application No. PCT/CN2023/075623, filed on Feb. 13, 2023.

(51) Int. Cl.
*G06F 21/85*          (2013.01)
*G06F 21/56*          (2013.01)
(52) U.S. Cl.
CPC ............ *G06F 21/85* (2013.01); *G06F 21/567* (2013.01); *G06F 2221/034* (2013.01)
(58) Field of Classification Search
None
See application file for complete search history.

(56) References Cited

U.S. PATENT DOCUMENTS

2018/0097629 A1*   4/2018  Soffer ................... H04L 9/3234
2018/0268144 A1*   9/2018  Warpinski .............. G06F 21/85
2023/0144949 A1*   5/2023  Zhang ................... G06F 9/5088
                                                          718/104

OTHER PUBLICATIONS

PCT/CN2023/075623 Written Opinion of the International Search Authority, Original Chinese, May 23, 2023, 4p.
PCT/CN2023/075623 Written Opinion of the International Search Authority, English Translation, May 23, 2023, accessed Sep. 12, 2024, 5p.
PCT/CN2023/075623 International Search Report, Original Chinese, May 23, 2023, 3p.
PCT/CN2023/075623 International Search Report, English Translation, May 23, 2023, accessed Sep. 12, 2024, 2p.

* cited by examiner

*Primary Examiner* — Cai Y Chen

(57)          ABSTRACT
A device and method used for protection against attacks using a HID keyboard or mouse, the device comprising: one or more HID internal interfaces for connecting the HID input interface of the protected device; one or more HID external interfaces for connecting to the external device; a forwarding control module for connecting to the HID internal interface and HID external interface respectively; and protocol analysis module, for performing protocol analysis on the external device connected to the HID external interface to determine whether the external device is a legitimate HID keyboard or mouse device; wherein, the forwarding control module is used to switch the HID internal interface and the HID external on or off to prevent illegal HID keyboard or mouse devices from accessing to the protected device. The present invention can prevent the unauthorized access of HID keyboard or mouse devices from damaging the protected devices.

10 Claims, 4 Drawing Sheets

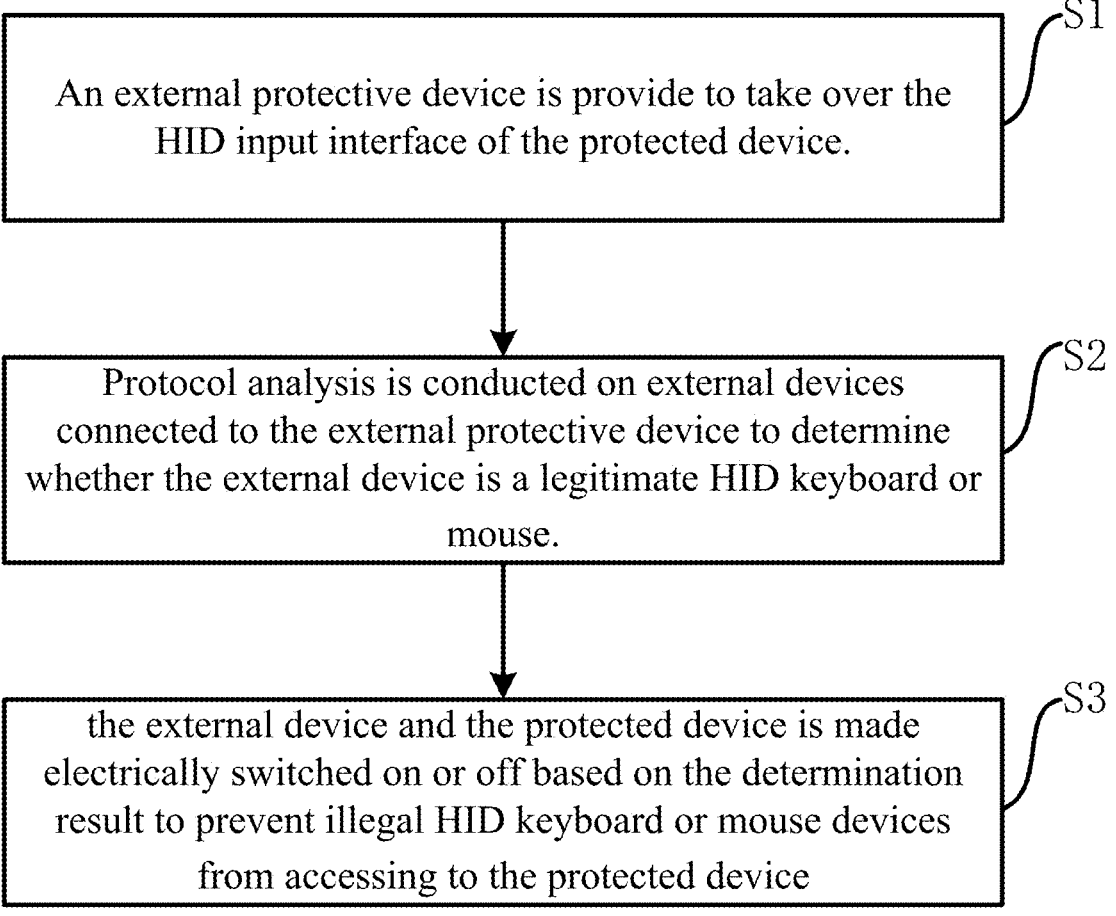

S1

An external protective device is provide to take over the HID input interface of the protected device.

S2

Protocol analysis is conducted on external devices connected to the external protective device to determine whether the external device is a legitimate HID keyboard or mouse.

S3 the external device and the protected device is made electrically switched on or off based on the determination result to prevent illegal HID keyboard or mouse devices from accessing to the protected device

Fig. 4

EXTERNAL PROTECTIVE DEVICE AND METHOD FOR PROTECTION AGAINST ATTACKS USING A HID KEYBOARD OR MOUSE

CROSS-REFERENCE TO RELATED APPLICATION

This application a continuation of International Application PCT/CN2023/075623 filed Feb. 13, 2023 and claims the benefit of Chinese Patent Application No. 202210244367.2, filed on Mar. 11, 2022 in the China National Intellectual Property Administration, the disclosure of which is incorporated herein by reference.

BACKGROUND OF THE INVENTION

1. Technical Field

The present invention belongs to the field of device security protection technology, and particularly relates to an external protective device and method for protection against attacks using a HID keyboard or mouse.

2. Background Technology

For computer systems such as industrial control systems, commercial systems, or office systems, the means of illegal intrusion are becoming more and more subtle and sophisticated; therefore system security protection is becoming more and more important. One way to hack computer systems is to use disguised or modified keyboard, mouse and other user input devices, insert them to the interface of the system, and illegally read and write or destroy the system by transmitting illegal code to the system.

In order to prevent users from using a mouse and keyboard to damage the system, Chinese invention patent ZL 201410564213.7 proposes a PS/2 mouse and keyboard operation audit and control method, which provides a method for auditing and controlling the operation of a host PS/2 mouse and keyboard. Mainly through the analysis of PS/2 mouse and keyboard protocols using a microcontroller, the motion information of the mouse and keyboard can be obtained without affecting the use of the host, and can be controlled to turn on and off the PS/2 mouse and keyboard.

However, on the one hand, prior art cannot identify whether the mouse or keyboard connected to the system is an illegal mouse or keyboard, or an illegal device disguised as a mouse or keyboard; On the other hand, prior art cannot audit or authenticate the legality and operational behavior of devices such as mice and keyboards that are connected to the corresponding interface in real time without installing audit software inside the protected device. Due to the fact that illegal devices disguised as mice and keyboards can also generate normal keyboard or mouse operation data during illegal data exchange, prior art cannot truly protect the access and illegal operation of illegal devices, nor can it record and audit normal operation behavior.

In addition, today's mouse and keyboard basically no longer use the PS/2 interface, but use the more general USB interface that supports HID devices.

SUMMARY OF THE INVENTION

In view of this, one aspect of the present invention aims to solve the problem that prior art cannot effectively prevent illegal devices from disguising themselves as a keyboard or mouse to damage the system.

Another aspect of the present invention aims to solve the problem of being unable to record and audit keyboard or mouse communication protocols and operational behaviors when audit software cannot be installed within the protected device.

In order to achieve the above objectives, as the first aspect of the present invention, an external protection device used for protection against attacks using a HID keyboard or mouse is proposed, comprising: one or more HID internal interfaces for connecting the HID input interface of the protected device; one or more HID external interfaces for connecting to the external device; a forwarding control module for connecting to the HID internal interface and HID external interface respectively; and a protocol analysis module, for performing protocol analysis on the external device connected to the HID external interface to determine whether the external device is a legitimate HID keyboard device or mouse device; wherein, the forwarding control module is used to making the HID internal interface and the HID external interface electrically switched on or off based on the determination result provided by the protocol analysis module, to prevent illegal HID keyboard or mouse device from accessing to the protected device.

According to a preferred embodiment of the present invention, the step of making the HID internal interface and the HID external interface based on the determination result provided by the protocol analysis module comprises: when the external device is determined to be an illegal HID keyboard or mouse or not a HID keyboard or mouse device after protocol analysis, making the HID internal interface and the HID external interface electrically switched off; when the external device is determined to be a legitimate HID keyboard or mouse device after protocol analysis, making the HID internal interface and the HID external interface electrically switched on.

According to the preferred embodiment of the present invention, when the external device is an HID keyboard, the protocol analysis module is also used to monitor and record the input data of the HID keyboard; when the input data contains data from a predetermined blacklist, the protocol analysis module instructs the forwarding control module to make the HID internal interface and the HID external interface electrically switched off.

According to the preferred embodiment of the present invention, the external protective device further comprises: one or more video internal interface for connecting to the video output interface of the protected device; one or more video external interface for connecting to an video device; a screen recording module for connecting to the video internal interface, for recording the video data output by the protected device.

According to the preferred embodiment of the present invention, the screen recording module is connected to the protocol analysis module and under the control of the protocol analysis module; when the protocol analysis module determines that the external device has performed a specific operation, it controls the screen recording module to record video data.

According to a preferred embodiment of the present invention, the external protective device further comprises an image processing module for connecting to the screen recording module and the protocol analysis module respectively, and obtaining real-time video data from the screen recording module and perform real-time analysis on the video data; when the analysis result indicates that there is an abnormality in the video data, it notifies the protocol analysis module so that the protocol analysis module can make the HID internal interface and HID external interface electrically switched off.

According to a preferred embodiment of the present invention, the real-time analysis comprises: extracting frame images from the video data and recognizing the obtained frame images; when the recognition result includes a predetermined blacklist operation, generating an analysis result indicating the video data is abnormal.

According to a preferred embodiment of the present invention, the real-time analysis comprises: extracting frame images from the video data, obtaining the image features of the frame images, and comparing them with the image features of a predetermined image; when the similarity between the image features of the frame images and the predetermined image is higher than a threshold, generating an analysis result indicating the video data is abnormal.

Another aspect of the present invention proposes a device protection method used for protection against attacks using a HID keyboard or mouse, comprising the following steps: providing an external protective device to take over the HID input interface of the protected device; performing protocol analysis on external devices connected to the external protective device to determine whether the external device is a legitimate HID keyboard or mouse device; making the external device and the protected device electrically switched on or off based on the determination result to prevent illegal HID keyboard or mouse devices from accessing the protected device.

According to a preferred embodiment of the present invention, the step of making the external device and the protected device electrically switched on or off based on the determination result comprises: when the external device is determined to be an illegal HID key mouse device or a non HID key mouse device after protocol analysis, making the external device and the protected device electrically switched off; when the external device is determined to be a legitimate HID keyboard or mouse device after protocol analysis, making the external device and the protected device electrically switched on.

According to a preferred embodiment of the present invention, when the external device is an HID keyboard, the method further comprises: monitoring and recording the input data of the HID keyboard; when the input data contains data from a predetermined blacklist, making the external device and the protected device electrically switched off.

According to the preferred embodiment of the present invention, the method further comprises: real-time monitoring of data transmission between external devices and protected devices, stopping the data transfer from the protected device to the external device when it detects that there is a risk in a USB IN transaction, or when there is data in a USB OUT transaction.

The present invention has at least the following beneficial effects compared to the prior art:

(1) The present invention has a forwarding control module controlled by a protocol analysis module, so illegal HID keyboard or mouse devices cannot access to protected devices, solving the problem of ineffective prevention of illegal devices disguising themselves as a keyboard or a mouse to damage the system, and improving the system's protection against illegal HID keyboard or mouse devices.

(2) The present invention has a keyboard input monitoring and recording module controlled by a protocol analysis module, which can effectively block unauthorized keyboard input operations.

(3) The present invention has a real-time screen recording module that can achieve real-time backup and monitoring of interface images, in order to monitor the operation of HID keyboard or mouse devices in real time.

(4) The present invention has an image analysis module, which enables real-time analysis of illegal operations of legitimate HID keyboard or mouse devices, further improving the security of HID keyboard or mouse device access.

BRIEF DESCRIPTION OF DRAWINGS

FIG. 4 is a flowchart of an embodiment of a device protection method used for protection against attacks using a HID keyboard or mouse according to the present invention.

DETAILED DESCRIPTION

Figure 1:
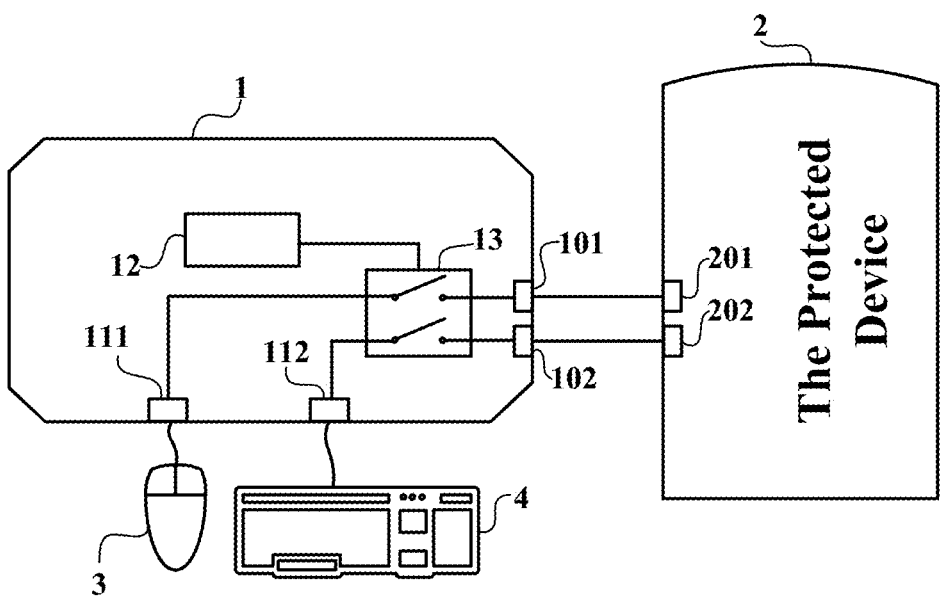
FIG. 1 is a schematic diagram of the structure of the first embodiment of an external protective device used for protection against attacks using a HID keyboard or mouse of the present invention.

In order to make the purpose, technical solution, and advantages of the present invention clearer and more understandable, the following will provide further detailed explanations of the present invention in conjunction with specific embodiments and with reference to the accompanying drawings.

To solve the problem that prior art cannot effectively prevent illegal devices from disguising themselves as keyboards or mice to damage the system, the present invention proposes an external protective device (EPD) used for protection against attacks using a HID keyboard or mouse. The so-called external protective device is a physical device that is externally connected to the protected device. By taking over the specific interface of the protected device (PD), it ensures that external devices that need to access the protected device must be connected to the external protective device in order to access it, thus achieving the purpose of protecting the protected device without installing security protection software on the protected device.

A HID device, also known as Human Interface Devices, is a computer add-on device designed to be used directly by humans. Unlike other devices such as external hard drives or wireless cards, HID typically has buttons or controls that allow humans to interact with computers. Most modern human-machine interface devices use the Universal Serial Bus (USB) communication protocol; before the name HID device was used, the number of protocols for computer devices was limited. Manufacturers are restricted from manufacturing input devices that belong to a narrow category, and whenever a new experimental input controller is manufactured, computer companies are forced to write driver programs. HID devices aim to address this limitation and encourage the construction of new types of input devices. HID devices contain pre programmed data called HID descriptors, which report information to the host when the device first connects. The HID descriptor tells the computer the purpose of each packet sent from the interface device. Basically, these data provide "updates" to the host and notify the computer of which inputs are needed. Although most HID hardware is designed for user control of the computer, the protocol is not limited to inputs. HID output can also be sent from a computer to a device. This communication capability is typically used to provide information, such as status lights.

The HID keyboard or mouse device referred to in the present invention refers to a mouse or keyboard that meets the definition of HID. Due to the universal nature of HID devices, most keyboards, mice, and other devices are currently configured as HID keyboard or mouse devices, which provide more convenient conditions for illegal HID keyboard or mouse device access. Therefore, the present invention proposes an external protection device used for protection against attacks using a HID keyboard or mouse, which includes at least one HID internal interface, one HID external interface, a forwarding control module, and a protocol analysis module. The HID internal interface is used to connect to the HID input interface of the protected device, while the HID external interface is used to connect to external devices. Usually, the HID input interface is a USB interface, so the HID internal interface and HID external interface of the present invention are usually interfaces that comply with the USB protocol. However, the HID internal interface and HID external interface of the present invention do not exclude interface types that comply with other standard protocols.

The protected device in the present invention refers to a computer system with security requirements, such as industrial control hosts, servers, etc., and can also be other commercial or household computer devices. As a protected device host, server, etc., the present invention is not limited to the operating system used, as long as it has the access function of HID devices and the corresponding hardware interface (HID input interface). For example, if the protected device has a USB interface for connecting devices such as keyboards and mice, the present invention can directly connect the HID internal interface of the external protective device of the present invention to the protected device through a USB connection cable. It is preferred that the external protective device has more than one internal interface, so that it can connect to all HID input interfaces of the protected device, forming comprehensive protection for HID input interfaces.

When an external protective device is connected to all HID input interfaces of the protected device, it is equivalent to taking over the HID input of the protected device. When external devices (including HID keyboard or mouse devices or other devices that may disguise themselves as HID keyboard or mouse devices) need to be connected to the protected device for user input operations, they must be connected to the external protective device. Specifically, the external device is connected to the HID external interface of the external protective device, which is typically an interface that complies with the USB standard protocol.

In order to carry out safety monitoring on the external equipment connected to the external protective equipment of the present invention, the external protective device has some functional modules inside. It should be noted that the module referred to herein the present invention is hardware or software with specific functions, or a combination of software and hardware. For example, a module can be a microcontroller that is written into a specific computer program, or a general-purpose processor that can read and execute computer programs, as well as components with specific functions composed of related control circuits. Moreover, different modules are only distinguished in terms of functionality. In specific implementation, they can be implemented using different hardware or software, or in the same hardware or software, or partially implemented by hardware and partially implemented by software.

As mentioned earlier, the external protective device of the present invention includes a forwarding control module and a protocol analysis module. The forwarding control module is respectively connected to the HID internal interface and the HID external interface. The protocol analysis module is connected to the forwarding control module and performs protocol analysis on external devices connected to the HID external interface to determine whether the external device is a legitimate HID keyboard or mouse device. The forwarding control module makes the HID internal interface and HID external interface electrically switched on or off based on the determination result provided by the protocol analysis module, to prevent illegal HID keyboard or mouse devices from accessing to the protected device. It should be noted that the forwarding control module detects in real time whether the HID external interface is connected to an external device, and when it detects that an external device is connected, the protocol analysis module performs protocol analysis in real time to determine the legitimacy of the external device. Based on the determination result, it decides whether to make the HID internal interface and the HID external interface electrically switched on. In this way, false or illegal HID keyboard or mouse devices cannot access to the internal interface, fundamentally preventing illegal personnel from illegally accessing protected devices by disguising or forging HID keyboard or mouse devices.

Specifically, the determination and control refer to: when the external device is not be protocol analyzed, or is determined to be an illegal HID keyboard or mouse device after protocol analysis, the HID internal interface and HID external interface are made electrically switched off. When the external device is determined to be a legitimate HID keyboard or mouse device after protocol analysis, the HID internal interface and the HID external interface are made electrically switched on. In this way, after protocol analysis, only legitimate HID keyboard or mouse devices are allowed to access the protected devices.

Furthermore, the protocol analysis process in the present invention is as follows:

(1) Device Enumeration Stage

The characteristics of USB devices are described by the USB descriptor in the internal firmware of the USB device. After the USB device is inserted into the USB interface of a computer or other device, the USB controller of the computer or other device will obtain the descriptor information of the USB device to confirm the access mode of the USB device and load the corresponding driver program. USB descriptors include device descriptors (supplier ID, product ID (PID), and serial number information), configuration descriptors (number of configurations, currently used configuration identifier, number of supported interfaces), interface descriptors (interface subclasses, interface protocols), endpoint descriptors, string descriptors, and HID class devices that comply with the USB protocol will also have three additional descriptors: HID descriptor, report descriptor, and physical descriptor.

Accordingly, the protocol analysis module of the present invention obtains real-time monitoring of the communication process of external devices connected to the HID external interface by connecting to the forwarding control module and monitoring the data transmitted by the external devices in accordance with the USB communication protocol, and controls the devices connected to the HID external interface.

When an external device is plugged into the HID external interface, the forwarding control module starts USB device enumeration. During the USB device enumeration process, the forwarding control module receives data sent by external devices for USB device enumeration and sends it to the protocol analysis module. The protocol analysis module analyzes the data received from the forwarding control module. When the data conforms to the USB protocol, the protocol analysis module extracts supplier ID, product ID (PID) and serial number information, configuration number, currently used configuration identifier, number of supported interfaces, interface number, interface class, interface subclass, interface protocol, etc. according to the USB protocol specification.

According to the USB protocol specification, the type definition of HID devices is placed in the interface descriptor. According to the present invention, the protocol analysis module determines the type of external device based on the information of the interface descriptor. When it is determined that the external device is not an HID device or a USB composite device (a device with HID and other USB characteristics, such as USB storage+HID devices), the protocol analysis module sends instructions to the forwarding control module to prevent the external device from accessing.

(2) Device Usage Stage

According to the USB specification, the HID device transmission type is interrupt transmission. All token packets for transmitted transactions are initiated by the USB Host, meaning that all USB transactions (Setup transactions, IN transactions, OUT transactions) are manipulated by the USB Host.

Due to HID devices being input devices, the flow direction of the non-control data can only be the direction in which the HID device flows to the host. In order to solve the problem that the keyboard, mouse communication protocol and operation behavior cannot be recorded and audited under the condition that audit software cannot be installed in the protected device, the protocol analysis module of the present invention monitors the data transmission between the external device and the protected device in real time, monitors the interruption transmission to run the USB IN transaction, and strictly examines the USB OUT transaction (that is, the data transmission from the external device as a USB device to the protected device is allowed, and the data transmission from the protected device to the external device is strictly reviewed). The data transfer between external devices and protected devices is stopped when it is determined that there is a risk in the data of USB IN transactions according to predetermined rules. At the same time, when the data of USB OUT transactions is detected, the data transfer between external devices and protected devices is also stopped.

When determining that the external device is an HID keyboard, the protocol analysis module of the present invention also monitors and records the input data of the HID keyboard, and when the input data contains data from a predetermined blacklist, the protocol analysis module instructs the forwarding control module to make the HID internal interface and the HID external interface electrically switched off. The data in the blacklist includes harmful operation instructions for computers, such as connecting to the network, transmitting data, or executing specific programs.

In order to solve the problem of being unable to record and audit keyboard or mouse communication protocols and operation behaviors when audit software cannot be installed in the protected device, according to a preferred embodiment of the present invention, the external protective device also has screen recording and video monitoring functions. This feature is designed to prevent unauthorized personnel from using legitimate HID keyboard or mouse devices for illegal operations. That is to say, when a legitimate external HID keyboard or mouse device is connected to the protected device through the external protective device of the present invention, personnel's mouse, keyboard, and other operations (such as deleting data, formatting storage, copying files, etc.) may also cause serious system risks.

Therefore, on the one hand, the external protective device of the present invention may also include a video interface, which includes a video internal interface and a video external interface. The video internal interface is connected to the video output interface of the protected device, while the video external interface is connected to the video device. Thus, the present invention can obtain the video output data output by the protected device and display it through a video external device. Video interfaces such as VGA connectors, HDMI interfaces, etc. Video devices can be independent displays or integrated displays with external protective devices. Thus, users can monitor their operations on protected devices through video devices.

On the other hand, the external protective device of the present invention may also include a screen recording module, which is connected to the video internal interface and used to record the video data output by the protected device. The screen recording module is essentially a video storage module that can store the images displayed on the screen as videos, selectively compress them during storage, and save them in a predetermined video format. The saved video data can be used as backup data for subsequent analysis needs, or it can be sent to the corresponding control center on a regular basis for daily analysis.

As a preferred implementation, in order to save video storage space, the screen recording module is connected to the protocol analysis module and receives control from the protocol analysis module. When the protocol analysis module determines that the external device has performed a specific operation, it controls the screen recording module to record video data. Usually, the protocol analysis module can control the screen recording module to perform the recording operation only when the mouse, keyboard, or other HID keyboard or mouse devices are active.

As a further preferred embodiment, the external protective device of the present invention also has a real-time image analysis module to detect illegal operations performed by legitimate HID keyboard or mouse devices in real time. Specifically, the external protective device of the present invention comprises an image processing module, which is respectively connected to the screen recording module and the protocol analysis module, for obtaining real-time video data from the screen recording module and performing real-time analysis on the video data. When the analysis result shows that there is an abnormality in the video data, the protocol analysis module is notified so that the protocol analysis module can make the HID internal interface and the HID external interface electrically switched off.

One real-time analysis method is to extract frame images from the video data and perform OCR recognition on the captured frame images. When the OCR recognition result contains predetermined blacklist text, an analysis result indicating the presence of anomalies in the video data is generated. For example, if the text in the OCR recognition window contains "delete", "copy", or the name of a software, it is determined that there is an abnormality in the video data. Another real-time analysis method is to extract frame images from the video data, calculate the image features of the frame images, and compare them with the image features of a predetermined image. When the similarity between the image features of the frame images and the predetermined image is higher than a threshold, an analysis result indicating the presence of anomalies in the video data is generated. The predetermined image is a typical interface that appears when a computer is damaged, such as the shutdown interface, restart interface, command line interface, etc.

The following will illustrate the present invention through specific embodiments. It should be understood that the specific embodiments are only some specific examples of implementing the present invention, and their main function is to exemplarily explain the possible embodiments of the present invention. However, they do not mean that the present invention can only be implemented in the form of specific embodiments, nor should the specific embodiments be directly taken as the scope of protection required by the present invention.

FIG. 1 is a schematic diagram of the structure of the first embodiment of an external protective device used for protection against attacks using a HID keyboard or mouse according to the present invention. As shown in FIG. 1, the external protective device 1 has a first HID internal interface 101 and a second HID internal interface 102, which are respectively connected to the first HID input interface 201 and the second HID input interface 202 of the protected device. The external protective device 1 also has a first HID external interface 111 and a second HID external interface 112. The first HID external interface 111 and the second HID external interface 112 are respectively used to connect external devices. Here, as an example, they are respectively connected to a mouse 1 with a USB interface and a keyboard 4 with a USB interface. In addition, the external protective device 1 has a protocol analysis module 12 and a forwarding control module 13, both of which are implemented as hardware modules with information processing capabilities in this embodiment. Specifically, the protocol analysis module can be composed of programmable devices, while the forwarding control module includes controlled electronic switches.

However, the skilled in the art can understand that the protocol analysis module 12 and the forwarding control module 13 can be merged into one hardware, or both can be implemented by software modules executed by processors with general processing capabilities.

As shown in FIG. 1, the forwarding control module 13 is connected to the first HID internal interface, the second HID internal interface, as well as the first HID external interface and the second HID external interface, respectively, to make the first HID internal interface and the first HID external interface electrically switched on or off, and to make the second HID internal interface and the second HID external interface electrically switched on or off; The protocol analysis module 12 is connected to the access end and control end of the forwarding control module 13 (only one line is shown in the figure to indicate the connection relationship, but this does not mean that there must be only one connection line here). The protocol analysis module 12 reads the information of the first HID external interface and the second HID external interface from the access end, and controls the operation of the corresponding electronic switches inside the forwarding control module 13 by sending instructions to the control end. The protocol analysis module 12 performs protocol analysis on the external devices (mouse 3 and keyboard 4 in the figure) connected to the first HID external interface 111 and the second HID external interface 112 based on the information provided by the two HID external interfaces to determine whether the external device is a legitimate HID keyboard or mouse device.

The forwarding control module 13 makes each HID internal interface and HID external interface electrically switched on or off based on the instructions (representing the determination result) input from the control end by the protocol analysis module 12, in order to prevent illegal HID keyboard or mouse devices from accessing to the protected device. Here, as the protocol analysis module is connected to the input of the forwarding control module, once the forwarding control module 13 detects that the HID external interface is connected to an external device, the protocol analysis module 12 can perform real-time protocol analysis to determine the legitimacy of the external device, and decide whether to make the HID internal interface and HID external interface electrically switched on or off based on the determination result. In this way, fake or illegal HID keyboard or mouse devices cannot access to the internal interface, fundamentally preventing illegal personnel from illegally accessing the protected device by disguising or forging HID keyboard or mouse devices.

When the protocol analysis module 12 determines whether the external device is a legitimate HID keyboard or mouse device, the following operations are performed:

When an external device is plugged into the HID external interface, the forwarding control module 13 starts device enumerations. By analyzing the USB protocol during the device enumeration process, protocol analysis module 12 can extract the following information from the protocol data: supplier ID, product ID (PID) and serial number information, configuration number, currently used configuration identifier, number of supported interfaces, interface number, interface class, interface subclass, interface protocol, etc. from the USB protocol specification.

According to the USB protocol specification, the type definition of HID devices is placed in the interface descriptor. The protocol analysis module 12 first checks the device descriptor for bDeviceClass, bDeviceSubClass, and bDeviceProtocol values. Only when all three values are 0, does the USB device meet the HID class device requirements.

The protocol analysis module 12 will also extract relevant content from the interface descriptor and perform checks based on the following:

In the interface descriptor, the value of bInterface Class must be 0x03, and the value of bInterface SubClass must be 0 or 1. A value of 1 indicates that the HID device is a boot device (Boot Device, generally meaningful for PCs, meaning that the BIOS can recognize the HID device you are using when starting, and only standard mice or keyboards can be called Boot Devices). A value of 0 indicates that the HID device can only be recognized and used after the operating system is started. The value meaning of bInterface Protocol is: 1 for Keyboard and 2 for Mouse.

In addition, when the protocol analysis module determines that the external device is an HID keyboard, it also monitors and records the input data of the HID keyboard.

When the input data contains data from a predetermined blacklist, the protocol analysis module instructs the forwarding control module to make the HID internal interface and the HID external interface electrically switched on or off. The data in the blacklist includes harmful operation instructions for computers, such as connecting to the network, transmitting data, or executing specific programs.

Figure 2:
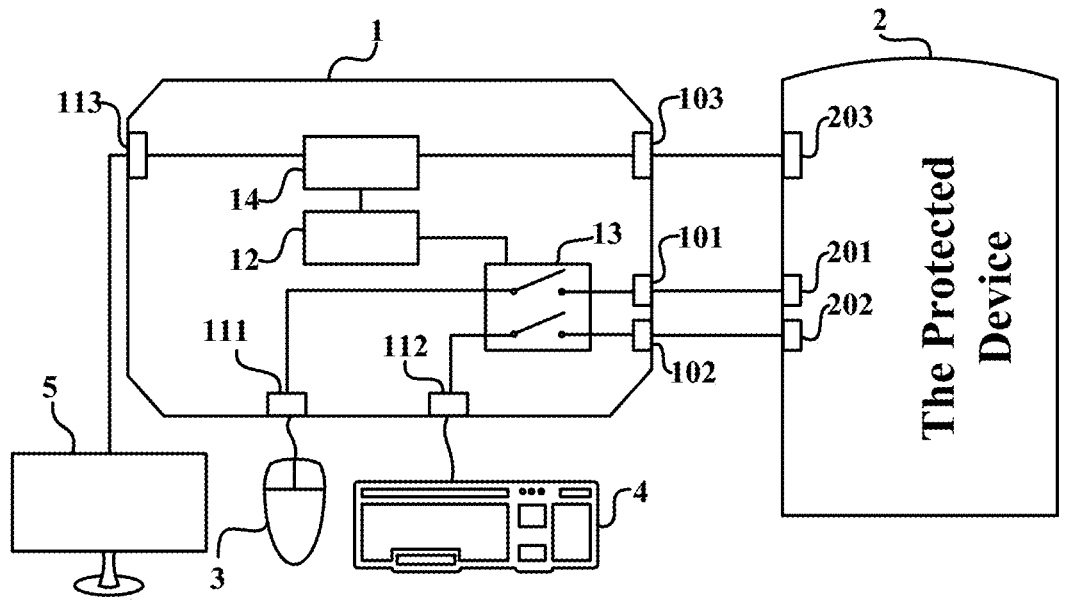
FIG. 2 is a schematic diagram of the structure of the second embodiment of the external protective device used for protection against attacks using a HID keyboard or mouse of the present invention.

FIG. 2 is a schematic diagram of the structure of the second embodiment of the external protective device used for protection against attacks using a HID keyboard or mouse of the present invention. As shown in FIG. 2, unlike the first embodiment, the external protective device 1 of this second embodiment further includes a video internal interface 103, a video external interface 113, and a screen recording module 14. The video internal interface 103 is connected to the video output interface 203 of the protected device, while the video external interface 113 is connected to the display 5. The video interface of this embodiment is a VGA interface, but it can also be replaced by an HDMI interface or the like in this embodiment. In addition, in other embodiments, the display 5 may also be a display screen integrated into the external protective device 1. Users can monitor their operations on protected devices through monitor 5.

As shown in FIG. 2, the screen recording module 14 is connected to the video internal interface 103 for recording the video data output by the protected device. The screen recording module 14 can be composed of a storage controller with large capacity storage function, which can store the images displayed on the screen as videos. And, preferably, it can be selectively compressed during storage and saved in a predetermined video format.

Furthermore, in this second embodiment, in order to save video storage space, the control end of the screen recording module 14 is connected to the protocol analysis module 12 to receive control from the protocol analysis module. The recording operation is only performed when the protocol analysis module 12 determines that the external device has performed mouse, keyboard, or other operations. In other embodiments, other conditions for starting or stopping records can also be set.

Figure 3:
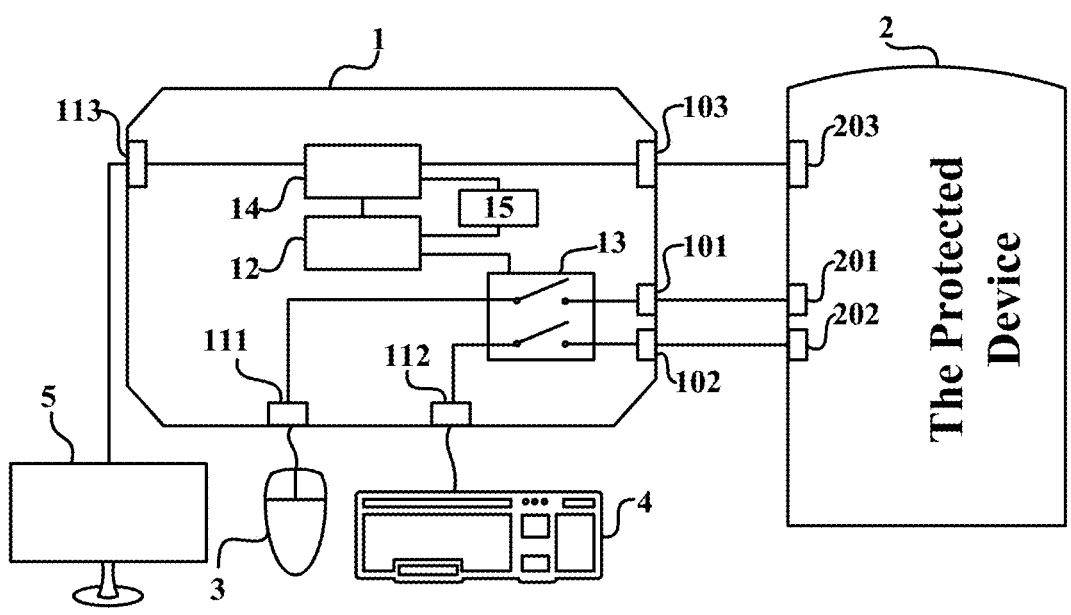
FIG. 3 is a schematic diagram of the structure of a third embodiment of an external protective device used for protection against attacks using a HID keyboard or mouse according to the present invention.

FIG. 3 is a schematic diagram of the structure of an external protective device use for protection against attacks using a HID keyboard or mouse according to the third embodiment of the present invention. This embodiment is a further improvement based on the second embodiment. As shown in FIG. 3, the external protective device of the third embodiment further includes an image analysis module 15 to detect illegal operations performed by legitimate HID keyboard or mouse devices in real time. The image analysis module 15 is respectively connected to the screen recording module 14 and the protocol analysis module 12, used to obtain real-time video data from the screen recording module and perform real-time analysis on the video data. When the analysis result indicates that there is an abnormality in the video data, it notifies the protocol analysis module so that the protocol analysis module can make the HID internal interface and HID external interface electrically switched off. In this embodiment, the image analysis module 15 is implemented by an independent hardware module, but in other embodiments, it can also be integrated into the protocol analysis module 12, or the image analysis module 15 and the protocol analysis module 12 can be integrated into one main control module. In addition, like other modules, the image analysis module 15 can also be implemented as a software module, which can be executed by any hardware with information processing capabilities inside the external protective device.

As mentioned earlier, the image analysis module 15 can perform various types of image analysis. Due to its connection to the screen recording module, it can obtain and record the interface images of the protected device in real time and perform real-time analysis. The present invention is not limited to specific analysis methods and is preferably designed to support updating or upgrading image analysis methods. As an example, one real-time analysis method is to extract frame images from the video data and perform OCR recognition on the extracted frame images. When the OCR recognition result contains predetermined blacklist text, an analysis result indicating the presence of anomalies in the video data is generated. For example, if the text in the OCR recognition window contains "delete", "copy", or the name of a software, it is determined that there is an abnormality in the video data. Another real-time analysis method is to extract frame images from the video data, calculate the image features of the frame images, and compare them with the image features of a predetermined image. When the similarity between the image features of the frame images and the predetermined image is higher than a threshold, an analysis result indicating the presence of anomalies in the video data is generated. The predetermined image is a typical interface that appears when a computer is damaged, such as the shutdown interface, restart interface, command line interface, etc.

Through the above embodiments, it can be seen that due to the forwarding control module controlled by the protocol analysis module of the present invention, illegal HID keyboard or mouse devices cannot access to the protected devices, solving the problem of ineffective prevention of illegal devices disguised as keyboards and mice from damaging the system and improving the system's protection against illegal HID keyboard or mouse devices. The present invention also uses a real-time screen recording module to backup and monitor the operation of HID keyboard or mouse devices in real time. Furthermore, the present invention can prevent illegal operations of legitimate HID keyboard or mouse devices through real-time analysis of the image analysis module, further improving the security of HID keyboard or mouse device access. The above methods solve the problem of being unable to record and audit keyboard or mouse communication protocols and operation behaviors when audit software cannot be installed in the protected device.

FIG. 4 is a flowchart of an embodiment of a device protection method for protection against attacks using a HID keyboard or mouse devices according to the present invention. As shown in FIG. 4, the method of the present invention includes:

S1. An external protective device is provided to take over the HID input interface of the protected device.

One of the objectives of the method of the present invention is to protect the protected device from unauthorized devices disguised as keyboards or mice that may cause damage to the system. As mentioned earlier, External Protective Device (EPD) is a physical device that is externally connected to the protected device. By taking over the specific interface of the protected device (PD), it ensures that external devices that need to access the protected device must be connected to the external protective device in order to access it, thus achieving the purpose of protecting the protected device without installing security protection software on the protected device. Usually, the HID input interface of the protected device is usually a USB interface, so the HID internal interface and HID external interface of the present invention are usually interfaces that comply with the USB protocol. However, the HID internal interface and HID external interface of the present invention do not exclude interface types that comply with other standard protocols.

S2. Protocol analysis is conducted on external devices connected to the external protective device to determine whether the external device is a legitimate HID keyboard or mouse device.

Specifically, when an external device is inserted into an external protective device, the external protective device initiates device enumeration. By analyzing the USB protocol during the device enumeration process, external protective devices can extract the following information from the protocol data: supplier ID, product ID (PID) and serial number information, configuration number, currently used configuration identifier, number of supported interfaces, interface number, interface class, interface subclass, interface protocol, etc. from the USB protocol specification.

According to the USB protocol specification, the type definition of HID devices is placed in the interface descriptor. The protocol analysis module 12 first checks the device descriptor for bDeviceClass, bDeviceSubClass, and bDeviceProtocol values. Only when all three values are 0, does the USB device meet the HID class device requirements.

External protective device will also extract relevant content from the interface descriptor and conduct inspections based on the following:

In the interface descriptor, the value of bInterface Class must be 0x03, and the value of bInterface SubClass must be 0 or 1. A value of 1 indicates that the HID device is a boot device (Boot Device, generally meaningful for PCs, meaning that the BIOS can recognize the HID device you are using when starting, and only standard mice or keyboards can be called Boot Devices). A value of 0 indicates that the HID device can only be recognized and used after the operating system is started. The value meaning of bInterface Protocol is: 1 for Keyboard and 2 for Mouse.

S3. The external device and the protected device is made electrically switched on or off based on the determination result to prevent illegal HID keyboard or mouse devices from accessing to the protected device.

Specifically, when the external device is determined to be an illegal HID key mouse device or a non HID key mouse device after protocol analysis, the external device is controlled to electrically be switched off from the protected device; When the external device is determined to be a legitimate HID keyboard or mouse device after protocol analysis, the external device and the protected device are made electrically switched on.

According to the USB protocol specification, the type definition of HID devices is placed in the interface descriptor. According to the present invention, the external protective device determines the type of external device based on the information of the interface descriptor. When it is determined that the external device is not an HID device or a USB composite device (a device with HID and other USB characteristics, such as USB storage+HID devices), it blocks the external device from accessing.

According to the preferred embodiment of the present invention, the method of the present invention may further include step S4: real-time monitoring of data transmission between the external device and the protected device, and stopping the data transmission from the protected device to the external device when a risk of USB IN transaction or data of USB OUT transaction is detected.

The present invention also aims to solve the problem of inability to record and audit keyboard or mouse communication protocols and operation behaviors when audit software cannot be installed in the protected device. Through this step, The specific embodiments described above provide further detailed explanations of the objectives, technical solutions, and beneficial effects of the present invention. It should be understood that the present invention is not inherently related to any specific computer, virtual device, or electronic equipment, and various general-purpose devices can also implement the present invention. The above description is only a specific embodiment of the present invention and is not intended to limit the present invention. Any modifications, equivalent substitutions, improvements, etc. made within the spirit and principles of the present invention should be included in the scope of protection of the present invention.

The invention claimed is:

1. An external protective device used for protection against attacks using a HID keyboard or mouse, comprising:
   one or more HID internal interfaces for connecting the HID input interface of the protected device;
   one or more HID external interfaces for connecting to the external device;
   a forwarding control module for connecting to the HID internal interface and HID external interface respectively; and
   a protocol analysis module, for performing protocol analysis on the external device connected to the HID external interface to determine whether the external device is a legitimate HID keyboard or mouse device;
   one or more video internal interfaces for connecting to the video output interface of the protected device;
   one or more video external interfaces for connecting to a video device;
   a screen recording module for connecting to the video internal interface, for recording the video data output by the protected device;
   an image processing module for connecting to the screen recording module and the protocol analysis module respectively, and obtaining real-time video data from the screen recording module and perform real-time analysis on the video data;
   wherein, the forwarding control module is used to making the HID internal interface and the HID external interface electrically switched on or off based on the determination result provided by the protocol analysis module, to prevent illegal HID keyboard or mouse devices from accessing to the protected device;
   when the analysis result on the video data indicates that there is an abnormality in the video data, the image processing module notifies the protocol analysis module so that the protocol analysis module can make the HID internal interface and HID external interface electrically switched off.

2. The external protection device as claimed in claim 1, wherein the step of making the HID internal interface and the HID external interface based on the determination result provided by the protocol analysis module comprises:
   when the external device is determined to be an illegal HID keyboard or mouse device or not a HID keyboard or mouse device after protocol analysis, making the HID internal interface and the HID external interface electrically switched off;
   when the external device is determined to be a legitimate HID keyboard or mouse device after protocol analysis, making the HID internal interface and the HID external interface electrically switched on.

3. The external protective device as claimed in claim 1, when the external device is an HID keyboard, the protocol analysis module is also used to monitor and record the input data of the HID keyboard;

when the input data contains data from a predetermined blacklist, the protocol analysis module instructs the forwarding control module to make the HID internal interface and the HID external interface electrically switched off.

4. The external protective device as claimed in claim 1, wherein, the screen recording module is connected to the protocol analysis module and under the control of the protocol analysis module;

when the protocol analysis module determines that the external device has performed a specific operation, it controls the screen recording module to record video data.

5. The external protective device as claimed in claim 1, wherein the real-time analysis comprises:

extracting frame images from the video data and recognizing the obtained frame images;

when the recognition result includes a predetermined blacklist operation, generating an analysis result indicating the video data is abnormal.

6. The external protective device as claimed in claim 1, wherein the real-time analysis comprises:

extracting frame images from the video data, obtaining the image features of the frame images, and comparing them with the image features of a predetermined image;

when the similarity between the image features of the frame images and the predetermined image is higher than a threshold, generating an analysis result indicating the video data is abnormal.

7. A device protection method used for protection against attacks using a HID keyboard or mouse, comprising the following steps:

providing the external protective device of claim 1 to take over the HID input interface of the protected device;

performing protocol analysis on external devices connected to the external protective device to determine whether the external device is a legitimate HID keyboard or mouse device;

making the external device and the protected device electrically switched on or off based on the determination result to prevent illegal HID keyboard or mouse from accessing the protected device;

recording the video data output by the protected device and perform real-time analysis on the video data;

when the analysis result on the video data indicates that there is an abnormality in the video data, make the HID internal interface and HID external interface electrically switched of.

8. The device protection method as claimed in claim 7, wherein, the step of making the external device and the protected device electrically switched on or off based on the determination result comprises:

when the external device is determined to be an illegal HID key mouse device or a non HID key mouse device after protocol analysis, making the external device and the protected device electrically switched off;

when the external device is determined to be a legitimate HID keyboard or mouse device after protocol analysis, making the external device and the protected device electrically switched on.

9. The device protection method as claimed in claim 7, when the external device is an HID keyboard, the method further comprises:

monitoring and recording the input data of the HID keyboard;

when the input data contains data from a predetermined blacklist, making the external device and the protected device electrically switched off.

10. The device protection method as claimed in claim 7, further comprising:

real-time monitoring of data transmission between external devices and protected devices, stopping the data transfer from the protected device to the external device when it detects that there is a risk in a USB IN transaction, or when there is data in a USB OUT transaction.

\* \* \* \* \*